(12) United States Patent  (10) Patent No.: US 7,581,617 B2
Pfeiffer et al.  (45) Date of Patent: Sep. 1, 2009

(54) METHOD FOR TRIGGERING A COUPLING UNIT

(75) Inventors: Wolfgang Pfeiffer, Grossbottwar (DE); Werner Mayer, Fellbach (DE); Werner Harter, Illingen (DE); Jochen Koepernik, Schortewitz (DE)

(73) Assignee: Robert Bosch GmbH, Stuttgart (DE)

( * ) Notice: Subject to any disclaimer, the term of this patent is extended or adjusted under 35 U.S.C. 154(b) by 167 days.

(21) Appl. No.: 10/575,717

(22) PCT Filed: Nov. 11, 2004

(86) PCT No.: PCT/EP2004/052918

§ 371 (c)(1),
(2), (4) Date: Apr. 12, 2006

(87) PCT Pub. No.: WO2005/047081

PCT Pub. Date: May 26, 2005

(65) Prior Publication Data
US 2007/0131472 A1  Jun. 14, 2007

(30) Foreign Application Priority Data
Nov. 11, 2003 (DE) ................. 103 52 495

(51) Int. Cl.
B62D 5/04 (2006.01)
(52) U.S. Cl. .................. 180/443; 180/402; 180/444; 192/84.2; 192/90
(58) Field of Classification Search .......... 180/443, 180/402, 444, 403, 446; 192/90, 84.2, 84.21
See application file for complete search history.

(56) References Cited

U.S. PATENT DOCUMENTS

| 5,002,142 | A | * | 3/1991 | Klosterhaus | 180/444 |
|---|---|---|---|---|---|
| 5,884,724 | A | * | 3/1999 | Bohner et al. | 180/402 |
| 6,138,788 | A | * | 10/2000 | Bohner et al. | 180/405 |
| 6,209,677 | B1 | * | 4/2001 | Bohner et al. | 180/406 |
| 6,220,385 | B1 | * | 4/2001 | Bohner et al. | 180/403 |
| 6,442,462 | B1 | * | 8/2002 | Nishizaki et al. | 701/41 |
| 6,612,393 | B2 | * | 9/2003 | Bohner et al. | 180/405 |
| 6,854,556 | B1 | * | 2/2005 | Yamamoto et al. | 180/444 |
| 6,976,555 | B2 | * | 12/2005 | Husain et al. | 180/443 |
| 7,161,317 | B2 | * | 1/2007 | Matsushita et al. | 318/432 |
| 2002/0117348 | A1 | * | 8/2002 | Shimizu et al. | 180/443 |
| 2002/0143450 | A1 | * | 10/2002 | Fujimoto et al. | 701/43 |
| 2003/0098197 | A1 | * | 5/2003 | Laurent et al. | 180/401 |
| 2004/0054456 | A1 | * | 3/2004 | Yoshida et al. | 701/41 |
| 2004/0060764 | A1 | * | 4/2004 | Kanda et al. | 180/402 |
| 2004/0133323 | A1 | * | 7/2004 | Kodama et al. | 701/41 |

FOREIGN PATENT DOCUMENTS

| DE | 198 05 015 | 7/1999 |
|---|---|---|
| DE | 101 14 600 | 1/2002 |
| DE | 100 52 343 | 7/2002 |
| DE | 101 35 736 | 4/2003 |

* cited by examiner

*Primary Examiner*—Lesley D Morris
*Assistant Examiner*—Maurice Williams
(74) *Attorney, Agent, or Firm*—Kenyon & Kenyon LLP (57) ABSTRACT

A method for triggering an electromechanical coupling unit having at least two coupling windings, and a steering system for implementing the method, are provided. The coupling unit selectively closes, and in this manner provides a mechanical coupling, only if both coupling windings are no longer supplied with electrical energy.

8 Claims, 12 Drawing Sheets

METHOD FOR TRIGGERING A COUPLING
UNIT

FIELD OF THE INVENTION

The present invention relates to a method for triggering an electromechanical coupling unit having at least two coupling windings for providing a selective coupling between a first mechanical device and a second mechanical device, and the present invention further relates to a steering system for providing a coupling between two mechanical devices.

BACKGROUND INFORMATION

Providing for an interaction between two mechanical devices requires a device for bringing about the interaction. Conventionally, such a device takes the form of a mechanical or hydraulic coupling. In the course of the development of electrical control systems, it is now also possible to bring about such an interaction in an electronic way, e.g., by transmitting control signals. For this purpose, an electrical control unit, or a so-called torque control element, is assigned to each of the two mechanical devices, by which the state of the mechanical device may be monitored and influenced using specific control measures.

The interaction between the mechanical devices may occur indirectly via the torque control elements that exchange data or signals regarding the state of the mechanical devices with each other.

Particularly in a motor vehicle, an interaction may be brought about in this manner. This may concern particularly the steering, that is, the transmission of a steering input from a driver with the aid of a steering handle to a vehicle wheel to be steered or a vehicle axle to be steered. Devices for transmitting steering inputs between the steering handle and the vehicle wheels to be steered or the vehicle wheel to be steered are called steer-by-wire systems. With these, it is possible to replace conventional steering devices such as steering rods and the like. For this purpose, steering inputs are transmitted with the aid of a computer, e.g., via a communication network of the motor vehicle.

In the event that the steer-by-wire system should fail, the steering capability must be maintained. This is feasible in that the normal operation of the steering provided by the steer-by-wire system is safeguarded by a mechanical backup for providing an emergency operation. In normal operation, the steering handle operated by a driver and the steered wheels of the vehicle are connected to each other via an electrical or electronic closed-loop control system. In emergency operation, the steering handle and the steered wheels of the vehicle are positively coupled via an electromechanical coupling.

Published German patent document DE 198 05 015 describes that in emergencies a mechanical positive coupling between the steering wheel and the steered vehicle wheels takes effect. For this purpose, a coupling, acted upon in a locking manner by spring force, is provided between the steering wheel and the steered vehicle wheels, which coupling may be opened by feeding hydraulic pressure into a displacement assembly. Due to its hydraulic interconnection, such a coupling has only limited applicability for a steer-by-wire system. The control of the hydraulic medium on the part of the steer-by-wire system would have to be provided in a roundabout way, for example, via an electronic wiring of a hydraulic circuit.

In the device described in published German patent document DE 100 46 168, a coupling is connected by two electric motors. To provide for a steer-by-wire operation, the electric motors keep the coupling in an open state. In predetermined failures, the coupling is closed automatically, it being possible, among other things, to provide for the electrical control motor, which is designed to continue to act upon steered vehicle wheels, to be switched off. In this type of control of a coupling, however, the functioning of the coupling is overly influenced by the functioning of the electric motors.

An objective of the present invention is to increase the operational reliability of a system for bringing about an interaction between two mechanical devices, e.g., in the case of a steering system for a motor vehicle having a steer-by-wire system.

SUMMARY

The method according to the present invention provides for triggering an electromechanical coupling unit having at least two coupling windings that are provided for the needs-based coupling between a first mechanical device and a second mechanical device. For this purpose, each of the coupling windings may be supplied with electrical energy by at least one connected electrical control unit. If none of the coupling windings are supplied with electrical energy, i.e., in case of an emergency, the coupling unit is closed and provides a mechanical coupling between the two mechanical devices. If at least one of the coupling windings is supplied with electrical energy, then the coupling unit is open and does not provide for a mechanical coupling between the mechanical devices. In this case, the coupling is provided via the steer-by-wire system.

The method according to the present invention thus guarantees the operational reliability of a steer-by-wire system.

For this purpose, the electrical control units may take on monitoring functions within the system. An electrical control unit supplies its associated coupling winding with current for as long as it, e.g., does not diagnose a fault within the system, or for as long as it itself is not affected by a fault or experiencing failure. A coupling between the mechanical devices via the coupling unit is provided if all electrical control units diagnose respective faults within the system or if they fail. This corresponds to the state in which the steer-by-wire system, which is otherwise configured to provide an interaction or coupling between the mechanical devices, has largely or entirely failed.

As an example, the method according to the present invention provides for the electrical control units in each case to be assigned to one of the two mechanical devices, and using at least one trigger element in each case, to supply the connected coupling winding with electrical energy as a function of one of its own system states. A system state may concern, for example, the operability of the electrical control unit.

According to the present invention, the electrical control units may have means that make it possible to detect or assess the state of a system, to make decisions accordingly and to supply a coupling winding accordingly with current or electrical energy. The means, which an electrical control unit may have for monitoring the system state, may be sensors, receiving devices for instructions or even processor or computer devices.

Another advantageous implementation of the control method according to the present invention may provide for a state of the coupling unit and particularly of the coupling winding to be detected by a sensor. For this purpose, a sensor signal characterizing the state is transmitted from the sensor via at least one communication line to the at least one associated electrical control unit.

Starting from at least one trigger element, the at least one associated electrical control unit supplies electrical energy to the coupling winding associated with it via at least one supply line as a function of the state of the coupling unit, e.g., of the coupling winding. In accordance with the control method according to the present invention, this ensures that it is possible to monitor not only the whole system or parts of it, but also in particular the coupling unit and a coupling winding of the coupling unit.

A sensor for providing for such monitoring may be configured as part of the coupling unit. Depending on its construction, the sensor may also be situated outside of the coupling unit. A sensor may take the form of a magnetic field sensor, electromagnetic current linkage sensor, current measuring device or the like. On the basis of the sensor signal it generates, the associated electrical control unit is able to decide whether or not it is necessary to supply power to a coupling winding.

A further example implementation of the method provides for a separate power supply to be assigned to each of the connected electrical control units. It is practical for each of the control units supplying the different windings of the coupling unit also to have its own power supply. If one of the power supplies fails, a reliable operation is still guaranteed. Only when all power supplies fail will the coupling unit close and provide the mechanical coupling.

The control units connected to the coupling windings may all be assigned to one of the two mechanical devices. Alternatively, the control units provided for supplying the coupling windings may be assigned partially to the first and partially to the second mechanical device.

For implementing the functional test, a further refinement of the control method according to the present invention provides for the coupling windings individually not to be supplied with electrical energy for brief periods, while the coupling unit remains open during the functional test. Thus it is possible to test the operability of the coupling unit, particularly of the coupling windings during normal operation, that is, when the interaction between the mechanical devices is provided by the other coupling device.

Such a test within the scope of a functional test may be performed by the at least one associated electrical control unit using the sensor assigned to a coupling winding. For this purpose, the coupling windings of a coupling unit are not supplied with electrical energy successively or alternately, but never simultaneously. For reasons of safety, this functional test allows for a test emergency operation to be conducted during the normal operation of the system.

The steering system according to the present invention for providing a coupling between a first mechanical device and a second mechanical device has a coupling unit having at least two coupling windings and a number of electrical control units, each coupling winding being connected to at least one of the electrical control units for supplying electrical energy. The coupling unit is configured in such a way that it is closed and provides a mechanical coupling between the two mechanical devices if none of the coupling windings are supplied with electrical energy. The coupling unit is open and provides no coupling between the two mechanical devices if at least one of the coupling windings are supplied with electrical energy.

The first mechanical device is typically a steering handle, for example a steering wheel. A steered vehicle wheel or even a steered vehicle axle is usually provided as a second mechanical device.

The electrical control units may each have at least one trigger element, which can be connected to a power supply, to ground or to no fixed potential.

A refinement of the system according to the present invention provides sensors for detecting the functioning of the coupling unit.

Information may be exchanged between the electrical control units via data lines.

Using the steering system according to the present invention, there are two ways to bring about an interaction between a steering handle and at least one steered vehicle wheel. First, there is a provision for the steering system in a normal operation to bring about an interaction according to the model of a so-called steer-by-wire system, in particular a coupling between the steering handle and the at least one steered vehicle wheel. Control or steering systems of a driver of the vehicle are received by the steering handle and are registered by the manual-torque control element. The manual-torque control element transmits these control or steering instructions electronically or wirelessly to the wheel-torque control element.

The wheel-torque control element acts upon the at least one steered vehicle wheel in accordance with the control or steering instructions. There may also be a provision, however, for the wheel-torque control element to detect movements of the at least one steered vehicle wheel and accordingly transmit signals via the manual-torque control element and the steering handle to the steering driver so as to impart to the latter a realistic feeling for the road. If a steer-by-wire system configured in this way should fail partially or entirely, then the interaction is provided in accordance with the control method of the present invention using the steering system of the present invention. In this manner, a mechanical back-up is implemented for a steer-by-wire system.

The features indicated above are merely exemplary in nature, and other combinations or alternatives are conceivable, without departing from the scope of the present invention.

DETAILED DESCRIPTION

Figure 1:
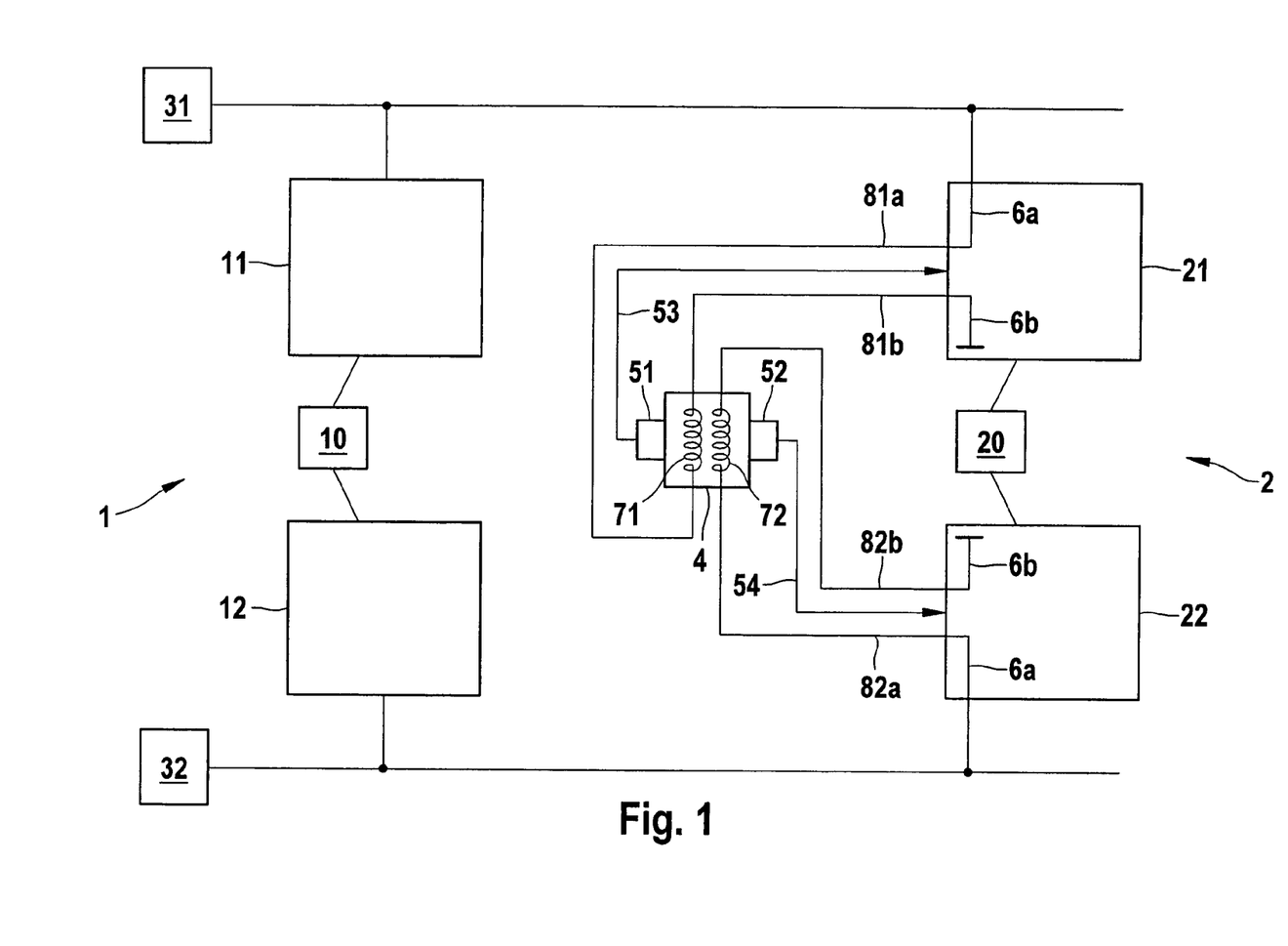
FIG. 1 shows a schematic block diagram illustrating a first example variant of the control implementation according to the present invention.

FIG. 1 shows a schematic block diagram of a first example variant of the control implementation according to the present invention. All subsequent figures or variants build on this FIG. 1. For this purpose, identical or functionally equivalent components for implementing the control method according to the present invention, e.g., for a steer-by-wire system, that are depicted in all figures have the same reference numerals, without a restriction of generality.

All FIGS. 1 through 6d schematically illustrate control devices and associated methods for electronic steering systems for motor vehicles. Such steering systems are called steer-by-wire systems. Such a steer-by-wire system is used to establish a link between one steering handle 10 and at least one steered vehicle wheel 20 or one steered vehicle axle. Provided electrical control units 11, 12, 21, 22 are also called sub-/semi-control devices. In the normal operation of the steer-by-wire system, an interaction between steering handle 10 and steered vehicle wheel 20 or the steered vehicle axle is brought about electronically, i.e., by the transmission of control signals. Thus there is no mechanical link between steering handle 10 and vehicle wheel 20.

In the event of a malfunction of the steer-by-wire system, a mechanical safeguard or back-up must be provided such that steering handle 10 and steered vehicle wheel 20 are mechanically or hydraulically positively coupled. A positive coupling is provided by closing a coupling unit 4 according to the present invention, coupling unit 4 being open in a normal operation of the steer-by-wire system. Using the control concept according to the present invention it is possible to switch and/or control coupling unit 4 in accordance with the respective requirements.

A manual-torque control element 1 is assigned to steering handle 10, a wheel-torque control element 2 being assigned to the at least one steered vehicle wheel 20. At least one vehicle axle usually has two vehicle wheels 20. The vehicle axle has at least one wheel-torque control element 2 for the control. Wheel-torque control element 2 may be configured to act upon both vehicle wheels 20 of a vehicle axle. Another refinement of the present invention may provide to assign each vehicle wheel 20 to a respective wheel-torque control element 2 for control or monitoring, so that each vehicle wheel 20 may be steered individually. Manual-torque control element 1 is composed of a first electrical control unit 11 and a second electrical control unit 12. Wheel-torque control element 2 is accordingly configured to have a first electrical control unit 21 and a second electrical control unit 22.

The first two electrical control units 11, 21 are connected to a first power supply unit 31, which supplies them with electrical energy. The two second electrical control units 12, 22 are connected to a second power supply unit 32, which supplies them with electrical energy. The mutually independent power supply units 31, 32 may have the same electrical voltage or electrical voltages that differ from each other. The entire steering system is therefore made up of four intrinsically safe and independent electrical control units 11, 12, 21, 22 and one coupling unit 4.

In the variants of the control implementation according to the present invention as shown in FIGS. 1 through 4, one coupling unit 4 is situated by suitable interconnection respectively between two of the electrical control units 11, 12, 21, 22. In the variants of the control concept according to the present invention as shown schematically in FIGS. 5a through 6d, an electromechanical coupling unit 4 is situated between four electrical control units 11, 12, 21, 22.

Coupling unit 4, having redundant coupling winding 71, 72 and being identical in all variants of the control concept according to the present invention, has the following components: a first coupling winding 71 having an associated first sensor 51 as well as a second coupling winding 72 having an associated second sensor 52. Sensors 51, 52 detect or monitor the circuit state of coupling unit 4, particularly of the coupling windings 71, 72 assigned to them. Using at least one of sensors 51, 52 it is possible to detect whether coupling unit 4 is open or closed or whether a coupling winding 71, 72 is supplied with current or is not supplied with current. Furthermore it is possible to determine the temperature of coupling unit 4. In addition, using the at least one sensor 51, 52, it is possible to ascertain other parameters relevant for the steering or control of the vehicle or the functioning of coupling unit 4.

In the event of an emergency operation, the present invention provides for steering handle 10 and the at least one steered vehicle wheel 20 to be positively coupled. In this case, the steer-by-wire system switches over to a mechanical back-up level. This is implemented in the present invention by electromechanical coupling unit 4 using the two coupling windings 71, 72. For this purpose, coupling unit 4 is able to be maintained in the open state (steer-by-wire operation) by having current supplied to a single coupling winding 71 or 72.

This measure ensures that a single error does not result in the immediate switchover to the back-up level. If both coupling windings 71, 72 are without current, then coupling unit 4 establishes the mechanical positive coupling, i.e., coupling unit 4 is closed.

When switching off an electrical control unit 11, 12, 21, or 22, the triggering of a first associated coupling winding 71, or 72 is also switched off. If in addition, or simultaneously, a second electrical control unit 11, 12, 21, 22 is switched off, then the second associated coupling winding 71, or 72 is switched off as well, and coupling unit 4 provides a mechanical link between steering handle 10 and the at least one steered vehicle wheel 20 or the at least one steered vehicle axle.

In order to inform each other about the current status of the coupling triggering and the coupling status (closed, open, temperature and other parameters) signaled by sensors 51, 52 of coupling unit 4, electrical control unit 11, 12, 21, 22 exchanges relevant information over data buses or communication lines 53, 54, 53a, 53b, 53c, 53d, 54a, 54b, 54c, 54d with the respective sensor 51, 52 of coupling unit 4.

Depending on which monitoring or controlling function is assigned to coupling unit 4 of an electrical control unit 11, 12, 21, 22 in an example variant of the control implementation according to the present invention, one trigger element 6a, 6b, or 6c, or two trigger elements 6a, 6b, 6c, is/are located in the respective electrical control unit 11, 12, 21, 22. Such a trigger element 6a, 6b, 6c may take the form of a power transistor, power MOSFET or the like. For this purpose, a coupling winding 71, 72 is connected by suitable lead wires 81a, 81b, 81c, 82a, 82b, 82c to two trigger elements 6a, 6b, 6c or is interconnected between two trigger elements 6a, 6b, 6c.

Coupling winding 71, 72 is supplied with current by trigger elements 6a, 6b, 6c, with which it is connected. Depending on the variant or example embodiment of the control implementation according to the present invention, trigger elements 6a, 6b, 6c may be distributed to one single electrical control device 11, 12, 21, 22 or to two electrical control units 11, 12, 21, 22. With different options for distributing trigger elements 6a, 6b, 6c and/or power output stages for supplying current to coupling winding 71, 72 to the four electronic control units 11, 12, 21, 22, one must take care that one single error (e.g., the failure of one power supply 31, 32) cannot result in both coupling windings 71, 72 being switched off simultaneously.

It is generally provided for an electrical control unit 11, 12, 21, 22 to react to the current state of one of coupling windings 71, 72 or of coupling unit 4 by allowing or cutting off a supply of current to a coupling winding 71, 72 in accordance with the respective requirements.

To ensure the correct functioning in the case of an error, there may be a provision briefly to switch off coupling windings 71, 72 individually in cyclical test phases during driving operation. The cutout ability of each individual coupling winding 71, 72 is tested, without coupling unit 4 causing a mechanical positive coupling, via existing sensors 51, 52 (e.g., magnetic field sensor, electromagnetic current linkage sensor) and/or by measuring the current using sensors 51, 52.

In the first example variant of the control implementation according to the present invention shown in FIG. 1, a first electronic unit 21 of wheel-torque control element 2 controls first coupling winding 71 using trigger elements 6a, 6b via suitable lead wires 81a, 81b. A second electronic control unit 22 of wheel-torque control element 2 controls second coupling winding 72 using trigger elements 6a, 6b via suitable lead wires 82a, 82b. The state of first coupling winding 71 is detected by associated first sensor 51. The corresponding or associated sensor signals are transmitted via data bus 53 to first electrical control unit 21 of wheel-torque control element 2.

Accordingly, the state of second coupling winding 72 is detected by associated second sensor 52. The corresponding sensor signals are transmitted via data bus 54 to second electrical control unit 21 of wheel-torque control element 2.

Figure 2:
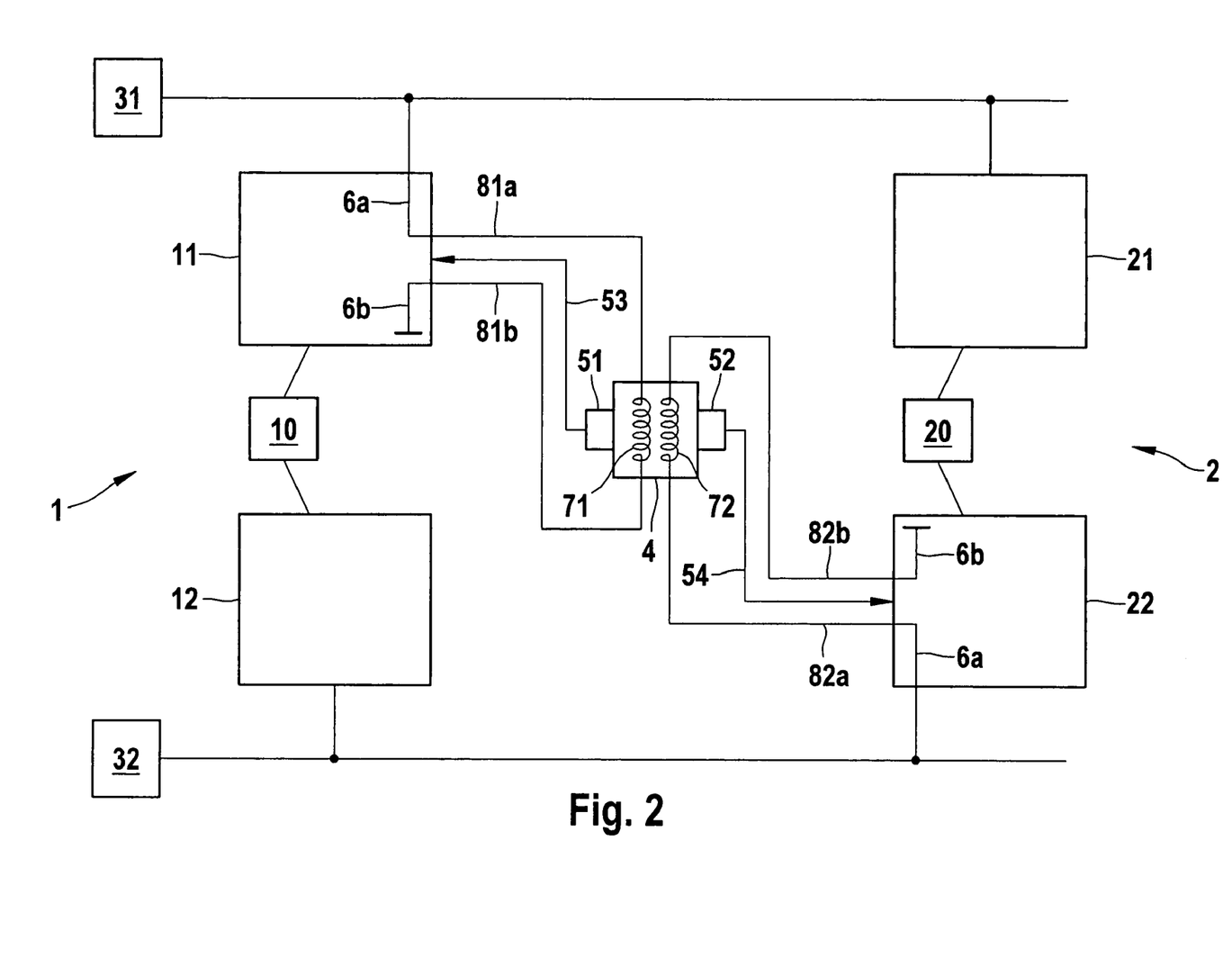
FIG. 2 shows a schematic block diagram illustrating a second example variant of the control implementation according to the present invention.

The second example variant of the control implementation according to the present invention shown in FIG. 2 provides for first electrical control unit 11 of manual-torque control element to control first coupling winding 71 of coupling unit 4. The state of first coupling winding 71 is detected by first sensor 51 and is transmitted via first communication line 53 to first electrical control unit 11. The supply of current to first winding 71 occurs between trigger element 6a via lead wire 81a and trigger element 6b via lead wire 81b.

Accordingly, second coupling winding 72 is controlled by second electrical unit 22 of wheel-torque control element 20. The state of second coupling winding 72 is detected by second sensor 52, and a corresponding signal is transmitted via second communication line 54 to second electrical control unit 22. The supply of current to second coupling winding occurs between trigger element 6a via lead wire 82a and trigger element 6b via lead wire 82b.

Figure 3:
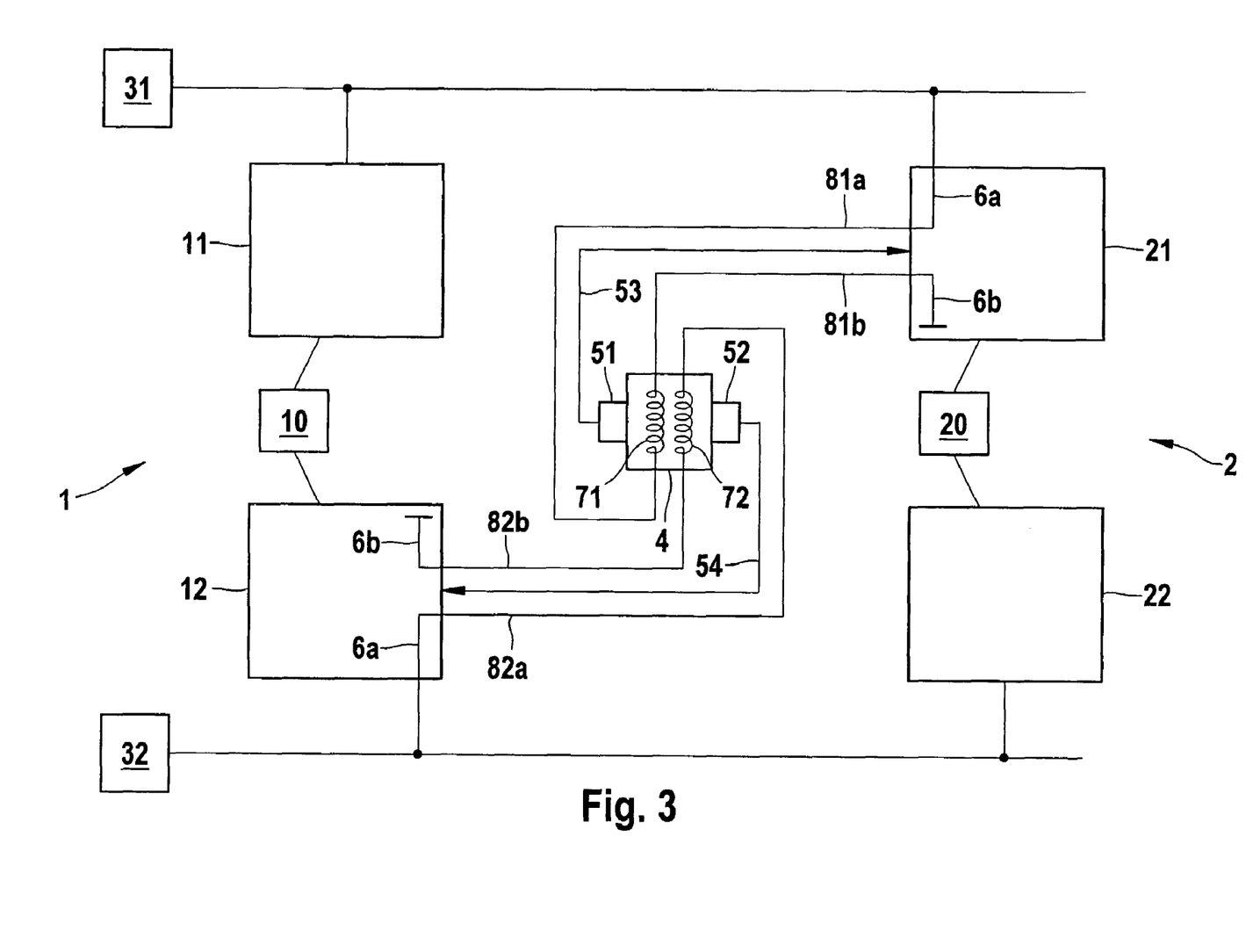
FIG. 3 shows a schematic block diagram illustrating a third example variant of the control implementation according to the present invention.

The third example variant of the control implementation according to the present invention shown in FIG. 3 is the interconnection of coupling unit 4 or of its coupling windings 71, 72, comparably configured as in the second variant, with the difference that the supply of current to coupling windings 71, 72 now occurs via the other respective electrical control units 21, 12 of wheel-torque control element 20 and of manual-torque control element 10.

Figure 4:
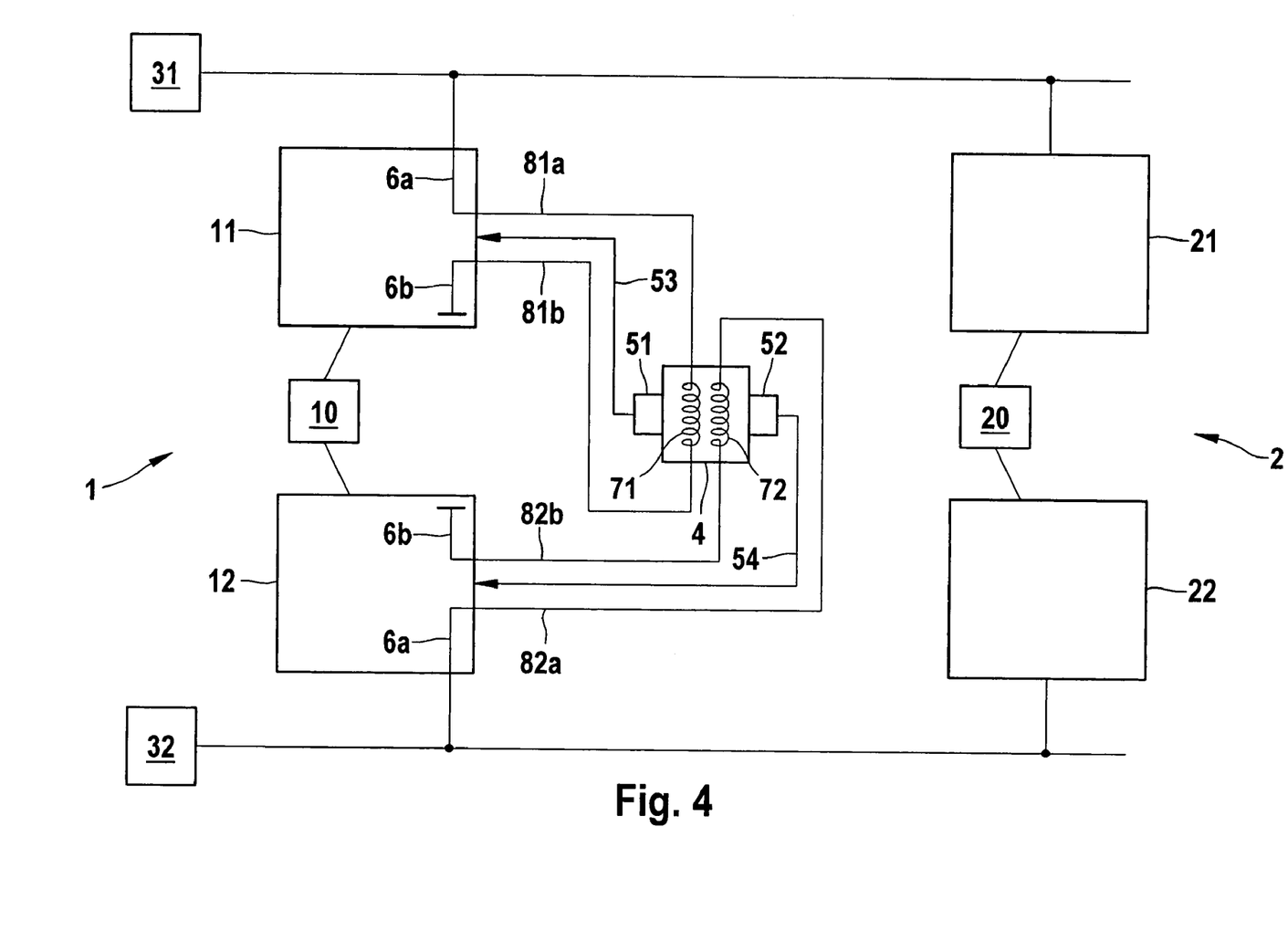
FIG. 4 shows a schematic block diagram illustrating a fourth example variant of the control implementation according to the present invention.

The fourth example variant of the control implementation according to the present invention shown in FIG. 4 is comparable to the first variant from FIG. 1. The two coupling windings 71, 72, however, are triggered by the two electrical control units 11, 12 of manual-torque control element 10.

FIGS. 5a, 5b, 5c, 5d respectively show the first, second, third, and fourth example embodiment of a fifth variant of the control implementation according to the present invention. Each of the four electrical control units 11, 12, 21, 22 contains a trigger element 6a, 6b for supplying current to, or controlling, coupling windings 71, 72. All four example embodiments provide for a trigger element 6a to be connected to the first or the second power supply 31, 32. A trigger element 6b is connected to ground.

Figure 5A:
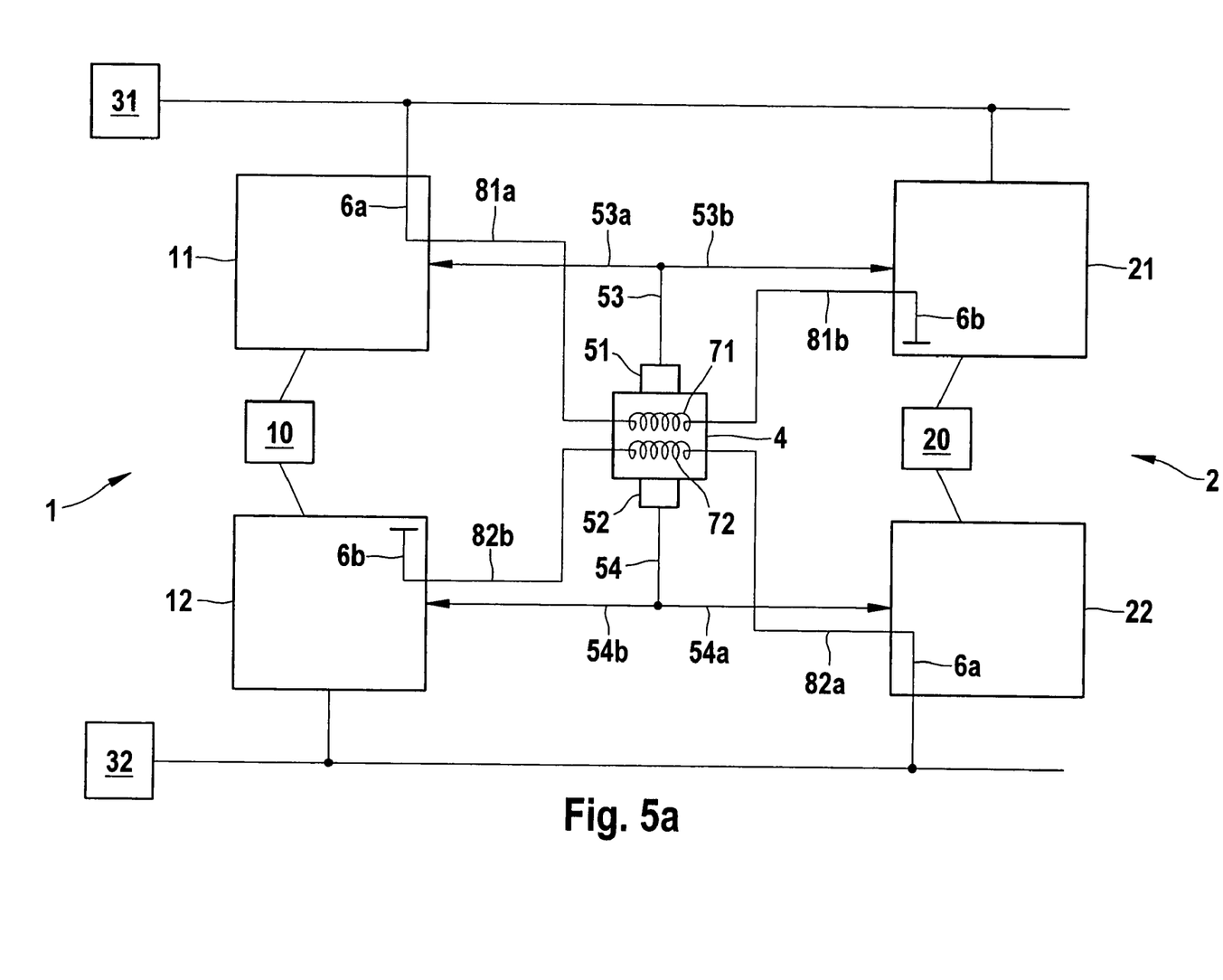
FIG. 5a shows a schematic block diagram of a first example embodiment of a fifth variant of the control implementation according to the present invention.

A detailed description of the components according to the present invention is given with reference to the example of the first embodiment of the fifth variant shown in FIG. 5a. In this instance, the first two electrical control units 11, 21 of manual-torque and wheel-torque control element 10, 20 are connected to first coupling winding 71. The state of first coupling winding 71 is detected by first sensor 51. The sensor signal characterizing the state is transmitted via communication line 53 and its branches 53a, 53b to first electrical units 11, 21. The supply of current to or triggering of first coupling winding 71 of coupling unit 4 occurs between trigger element 6a via lead wire 81a and trigger element 6b via lead wire 81b. Depending on the example embodiment of the fifth variant of the control implementation of the present invention, trigger element 6a is configured as a component of first electrical control unit 11 of manual-torque control element 1, and trigger element 6b is configured as a component of first electrical control unit 21 of wheel-torque control element 2, or vice versa.

FIG. 5a also shows that the two second electrical control units 12, 22 of manual-torque control element and wheel-torque control element 10, 20 are connected to second coupling winding 72. The state of first coupling winding 72 is detected by second sensor 52. The sensor signal characterizing the state is transmitted via communication line 54 and its branches 54a, 53b to first electrical units 11, 21. The supply of current to or triggering of second coupling winding 72 of coupling unit 4 occurs between trigger element 6a via lead wire 82a and trigger element 6b via lead wire 82b. Depending on the example embodiment of the fifth variant of the control implementation of the present invention, trigger element 6a is configured as a component of second electrical control unit 12 of manual-torque control element 1, and trigger element 6b is configured as a component of second electrical control unit 21 of wheel-torque control element 2, or vice versa.

Figure 5B:
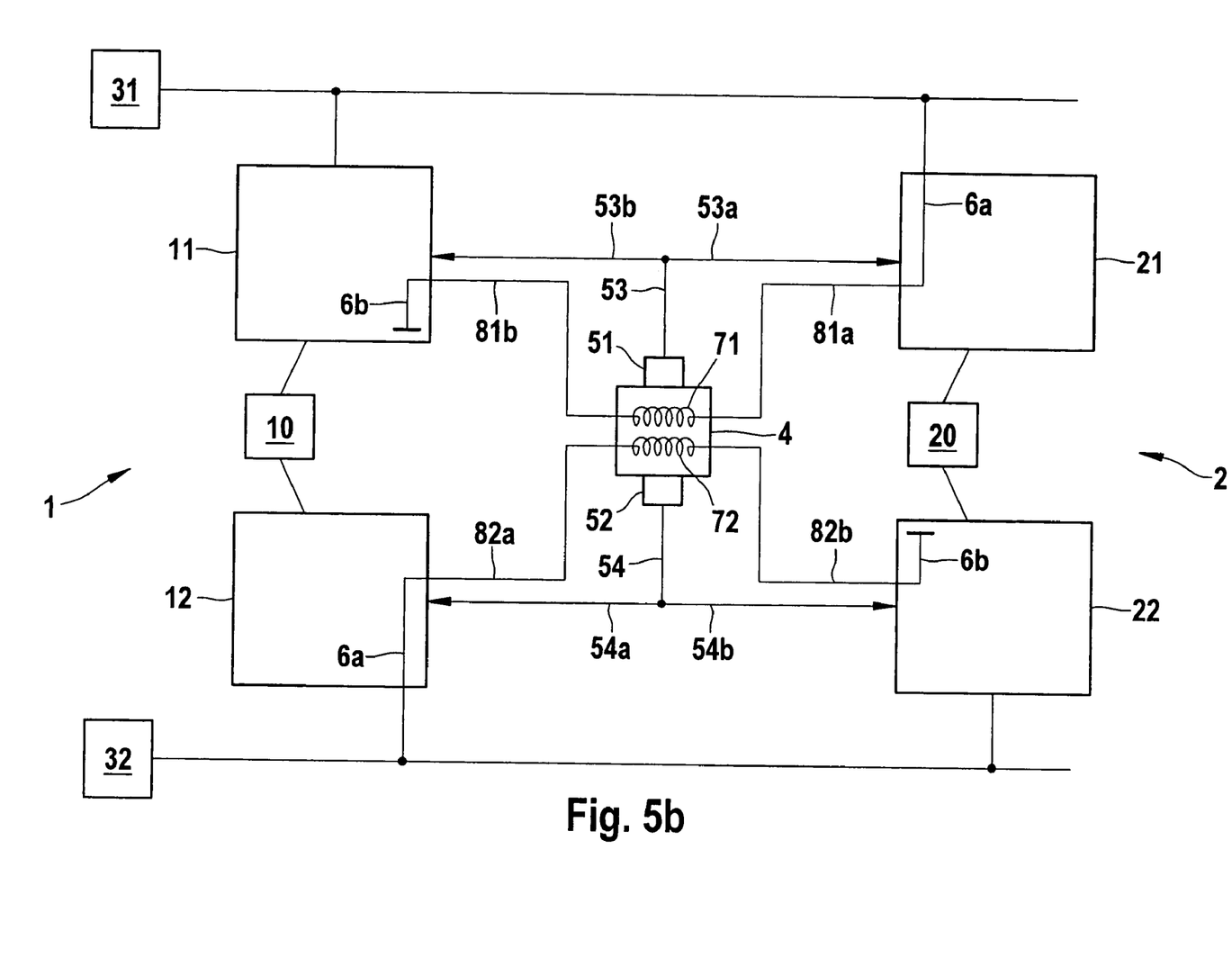
FIG. 5b shows a schematic block diagram of a second example embodiment of a fifth variant of the control implementation according to the present invention.
Figure 5C:
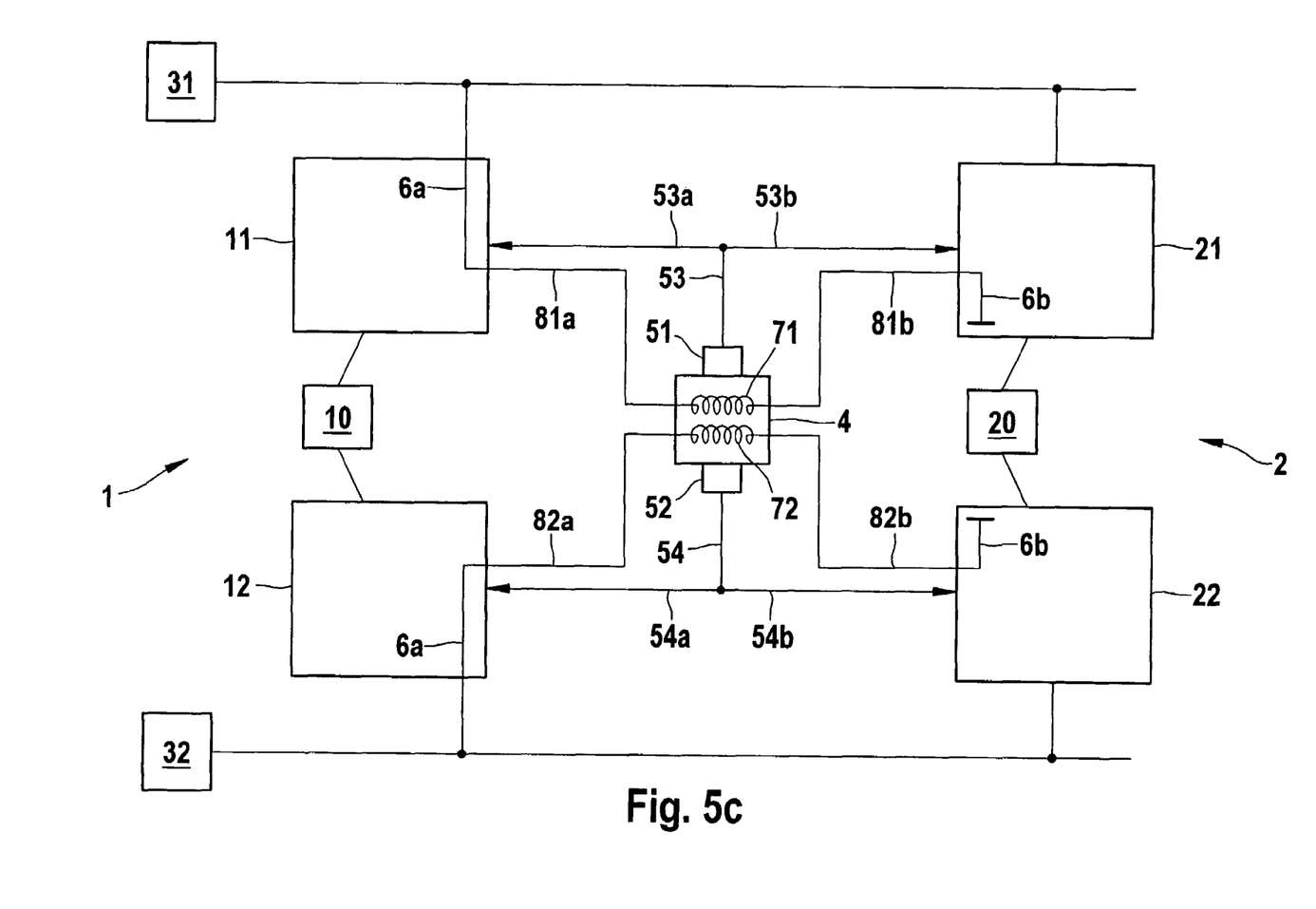
FIG. 5c shows a schematic block diagram of a third example embodiment of a fifth variant of the control implementation according to the present invention.
Figure 5D:
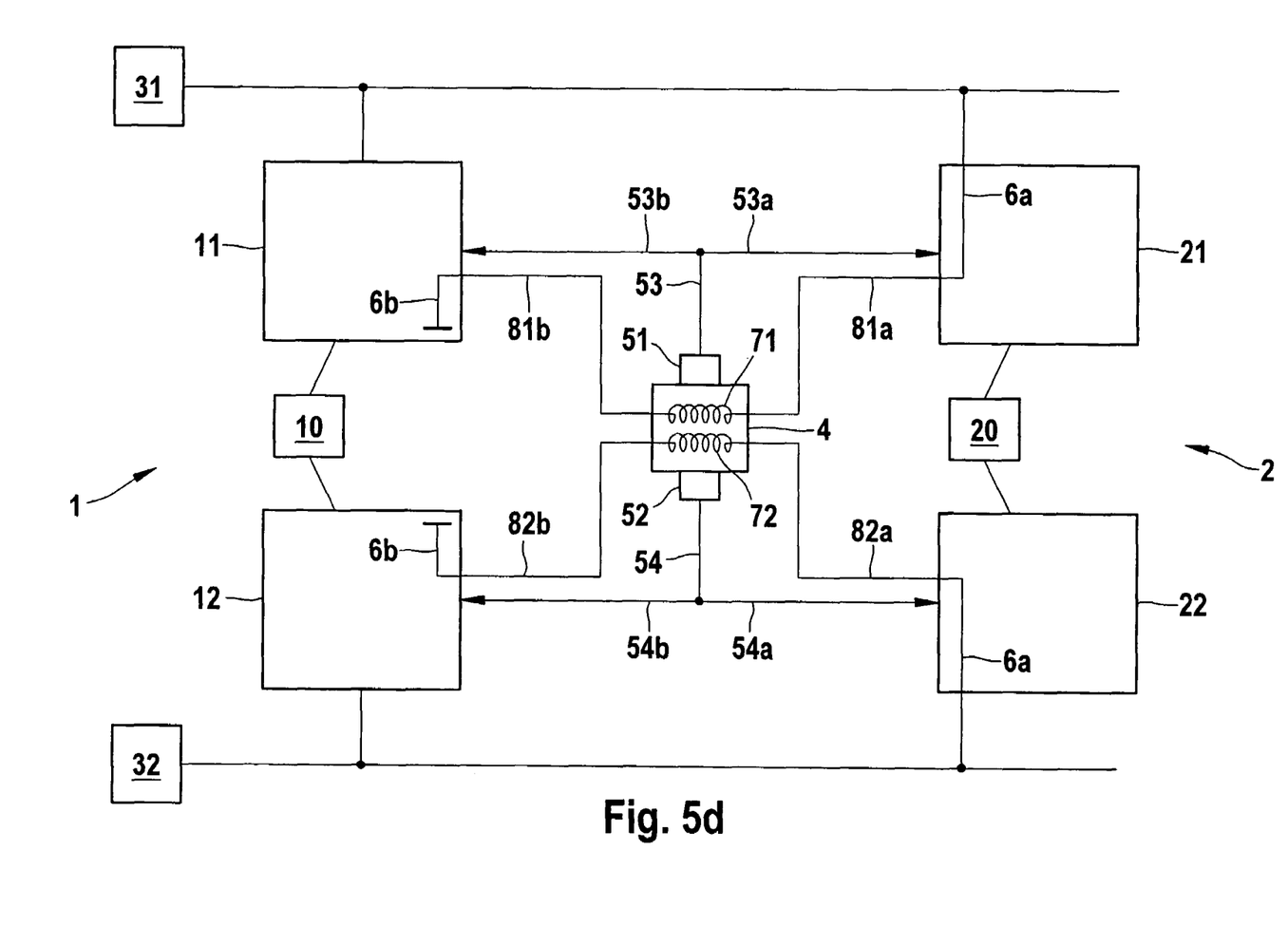
FIG. 5d shows a schematic block diagram of a fourth example embodiment of a fifth variant of the control implementation according to the present invention.

The second, third and fourth example embodiment of the fifth variant of the control implementation according to the present invention is shown in FIGS. 5b, 5c, 5d, respectively. These example embodiments differ from the first embodiment from FIG. 5a merely by different distributions of trigger elements 6a, 6b to electrical control units 11, 12, 21, 22.

In this case, the distribution of the coupling triggering or wiring to all four electrical units 11, 12, 21, 22 achieves a higher common-mode reliability in comparison to the previously mentioned variants 1 through 4.

Figure 6A:
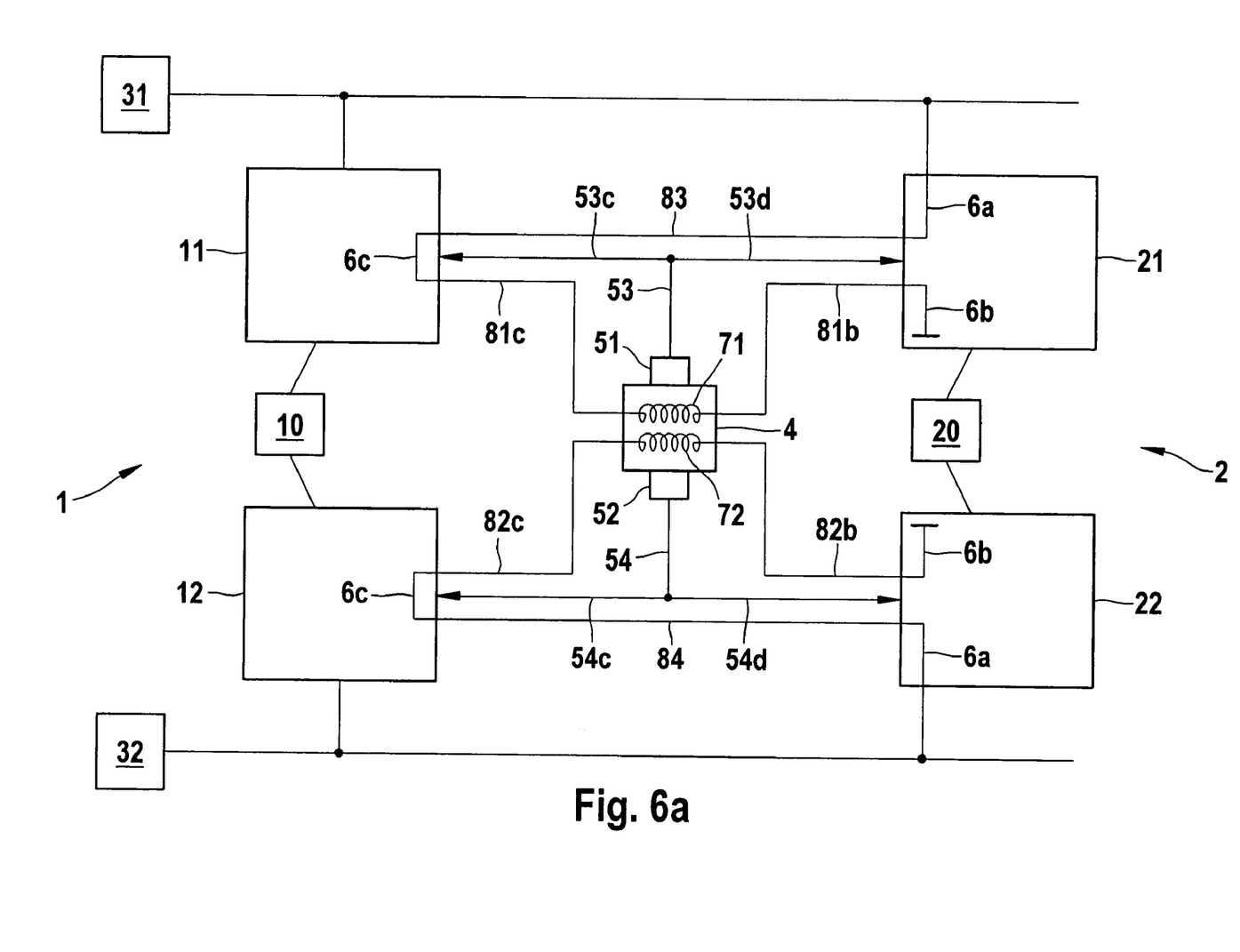
FIG. 6a shows a schematic block diagram of a first example embodiment of a sixth variant of the control implementation according to the present invention.
Figure 6B:
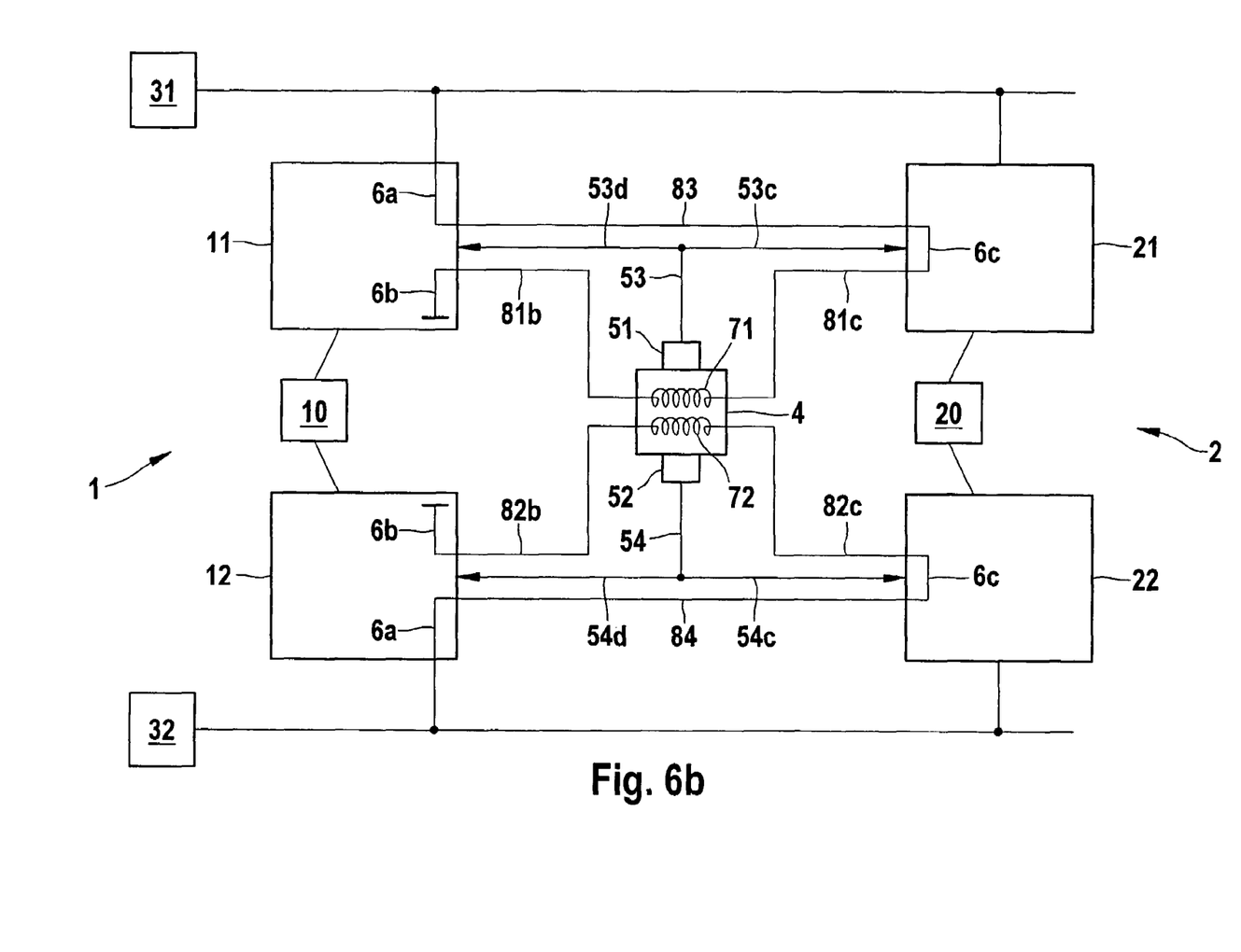
FIG. 6b shows a schematic block diagram of a second example embodiment of a sixth variant of the control implementation according to the present invention.
Figure 6C:
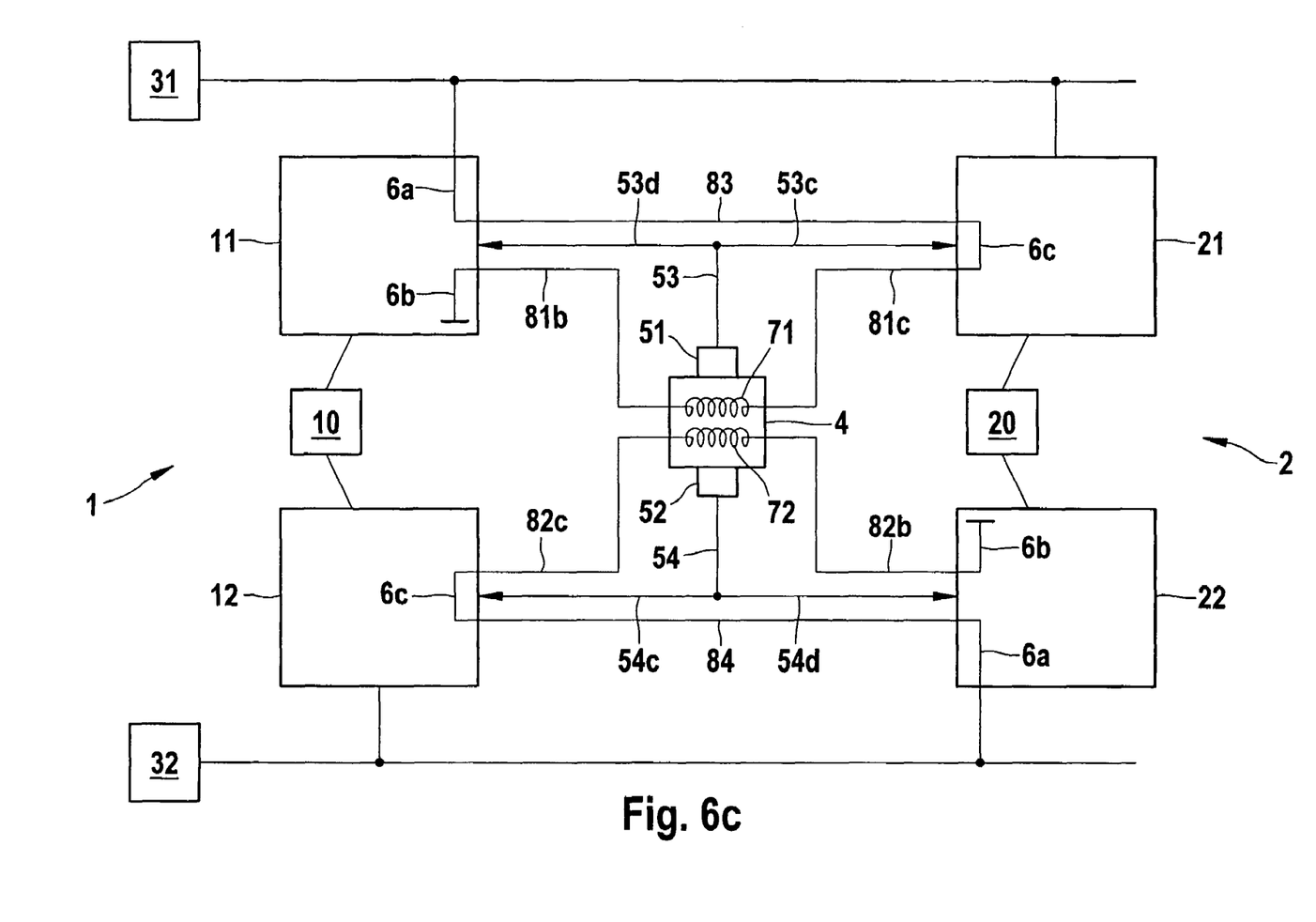
FIG. 6c shows a schematic block diagram of a third example embodiment of a sixth variant of the control implementation according to the present invention.
Figure 6D:
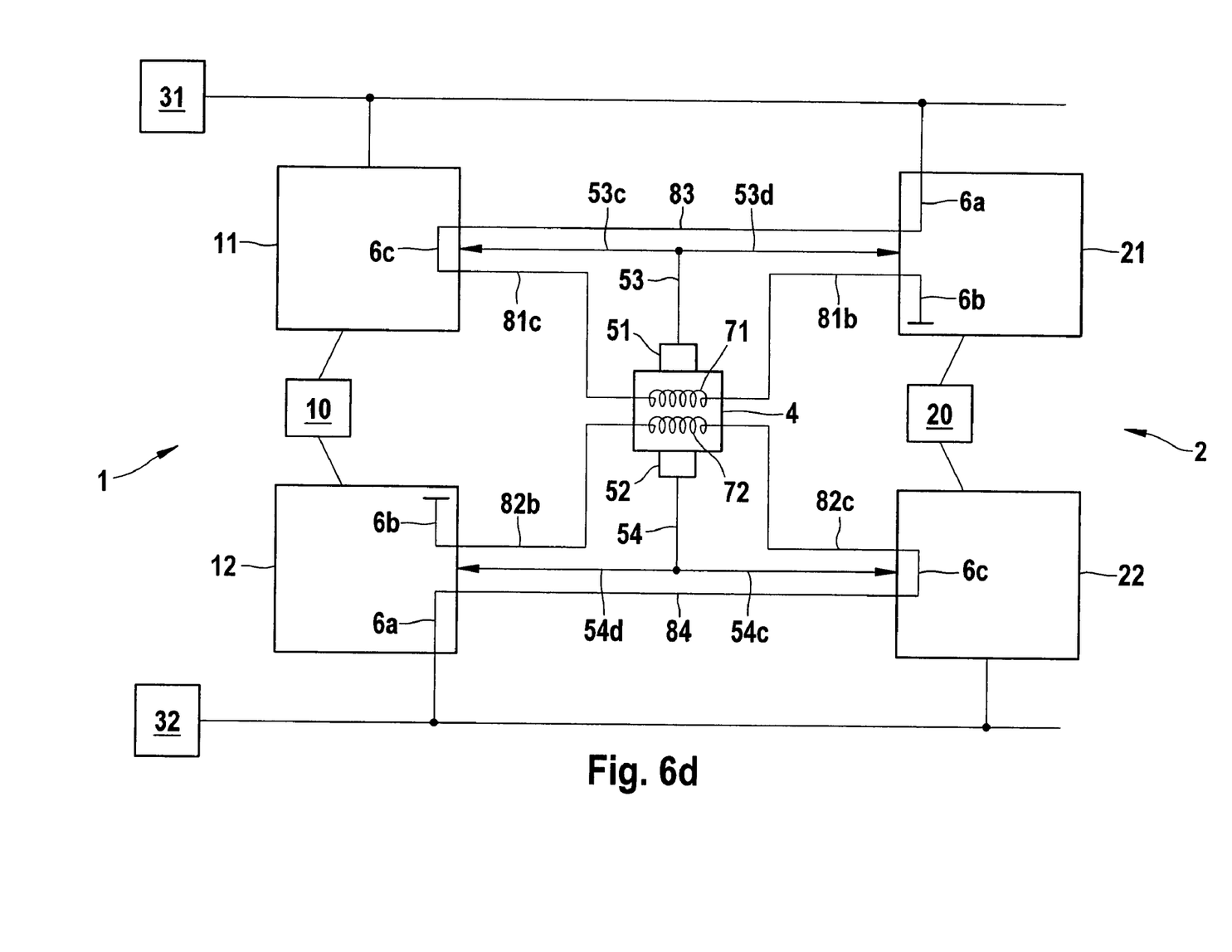
FIG. 6d shows a schematic block diagram of a fourth example embodiment of a sixth variant of the control implementation according to the present invention.

FIGS. 6a, 6b, 6c, and 6d respectively show the first, second, third, and fourth example embodiment of a sixth variant of the control implementation of the present invention. To explain the sixth variant, the example embodiment shown in FIG. 6a is described in detail. The other example embodiments differ merely in that they include trigger elements 6a, 6b, 6c as components of electrical control units 11, 12, 21, 22, and in their connection to other components of the steering system.

In the first example embodiment of the sixth variant, shown in FIG. 6a, the two electrical control units 21, 22 of wheel-torque control element 2 each contain two trigger elements 6a, 6b. In this instance one trigger element 6a of first electrical control unit 21 is connected to first power supply 31 and trigger element 6b of first electrical control unit 21 is connected to ground. Accordingly, trigger element 6a of second electrical control unit 22 is connected to second power supply 32. Trigger element 6b of second electrical unit 22 is accordingly connected to ground. The two electrical control units 11, 12 of manual-torque control element 10 each contain one trigger element 6c which is not connected to any fixed potential (power supply 31, 32 or ground).

The state of first coupling winding 71 is detected by first sensor 51. A corresponding sensor signal is transmitted via first communication line 53 and its branch 53c to first electrical control unit 11 of manual-torque control element 1, and via branch 53d to first electrical control unit 21 of wheel-torque control element 2. Starting from trigger element 6b of first electrical control unit 21 of wheel-torque control element 2, a supply of current to or wiring or control of first coupling winding 71 occurs via lead wire 81b to first coupling winding 71 and via lead wire 81c to electrical trigger element 6c of first electrical control unit 11 of manual-torque control element 1.

The series circuit is closed via the additional connecting line 83 between trigger element 6c of first electrical control unit 11 and trigger element 6a of first electrical control unit 21.

The state of second coupling winding 72 is detected by second sensor 52. A corresponding sensor signal is transmitted via second communication line 54 and its branch 54c to second electrical control unit 12 of manual-torque control element 1, and via branch 54d to second electrical control unit 22 of wheel-torque control element 2. Starting from trigger element 6b of second electrical control unit 22 of wheel-torque control element 2, a supply of current to or wiring or control of second coupling winding 72 occurs via lead wire 82b to second coupling winding 72 and via lead wire 82c to electrical trigger element 6c of second electrical control unit 12 of manual-torque control element 1.

The series circuit is closed via additional connecting line 84 between trigger element 6c of first electrical control element 11 and trigger element 6a of first electrical control unit 21.

The setup according to the sixth example variant of the control implementation, in which the two trigger elements 6a, 6b, which are connected to a fixed potential, are situated in accordance with the respective example embodiment in an electrical control unit 11, 12, 21, 22, avoids problems that may occur due to a ground offset between electrical control units 11, 12, 21, 22 of manual-torque and wheel-torque control elements 10, 20. The distribution of the triggering of the coupling to all four electrical control units 11, 12, 21, 22 results in a high common-mode reliability.

Lines 53 and 54 are configured as signal lines. There are several databus lines, not shown in the drawing, between control units 11, 12, 21, 22.

What is claimed is:

1. A method for selectively providing a coupling between a first mechanical device and a second mechanical device, comprising:

providing an electromechanical coupling unit having at least two coupling windings, wherein the coupling unit is configured to provide selective coupling between the first and second mechanical devices, and wherein each of the coupling windings is configured to be supplied with electrical energy by at least one connected electrical control unit;

actuating the coupling unit to be closed if none of the two coupling windings are supplied with electrical energy, whereby the coupling unit provides a coupling between the first and second mechanical devices; and actuating the coupling unit to be open if at least one of the two coupling windings is supplied with electrical energy, whereby the coupling unit provides no coupling between the first and second mechanical devices;

wherein:

at least one electrical control unit is respectively assigned to each of the first and second mechanical devices, wherein each electrical control unit selectively supplies, using at least one trigger element, the respective connected coupling winding with electrical energy, as a function of state of the respective connected coupling winding, each connected electrical control unit has a respective assigned power supply, the electrical control units connected to the coupling windings are each assigned to one of the two mechanical devices, the electrical control units detect, with the aid of sensors, the functioning of the coupling unit, and a functional test of the coupling windings is implemented, and each individual coupling winding is cut off from supply of electrical energy for a brief predetermined period and the coupling unit remains open during the functional test.

2. A steering system for selectively providing a coupling between a first mechanical device and a second mechanical device, comprising:

an electromechanical coupling unit having at least two coupling windings, wherein the coupling unit is configured to provide selective coupling between the first and second mechanical devices; and a plurality of electrical control units, wherein each coupling winding is connected to at least one of the electrical control units, and wherein each of the coupling windings is configured to be supplied with electrical energy by at least one connected electrical control unit;

wherein the coupling unit is configured such that the coupling unit is: a) closed if none of the two coupling windings are supplied with electrical energy, whereby the coupling unit provides a coupling between the first and second mechanical devices; and b) open if at least one of the two coupling windings is supplied with electrical energy, whereby the coupling unit provides no coupling between the first and second mechanical devices, and wherein:

at least one electrical control unit is respectively assigned to each of the first and second mechanical devices, wherein each electrical control unit selectively supplies, using at least one trigger element, the respective connected coupling winding with electrical energy, as a function of state of the respective connected coupling winding, each connected electrical control unit has a respective assigned power supply, the electrical control units connected to the coupling windings are each assigned to one of the two mechanical devices, the electrical control units detect, with the aid of sensors, the functioning of the coupling unit, and a functional test of the coupling windings is implemented, and each individual coupling winding is cut off from supply of electrical energy for a brief predetermined period and the coupling unit remains open during the functional test.

3. The steering system as recited in claim 2, wherein the first mechanical device is a steering handle and the second mechanical device is a steered vehicle wheel.

4. The steering system as recited in claim 3, further comprising:
   at least one sensor for detecting the functioning of the coupling unit.

5. The steering system as recited in claim 3, wherein at least one electrical control unit includes at least one trigger element for supplying the connected coupling winding with electrical energy.

6. The steering system as recited in claim 3, further comprising:
   at least one data line for exchanging information between the electrical control units.

7. The steering system as recited in claim 2, further comprising:
   at least one sensor for detecting the functioning of the coupling unit; and
   at least one data line for exchanging information between the electrical control units;
   wherein the first mechanical device is a steering handle and the second mechanical device is a steered vehicle wheel, and
   wherein at least one electrical control unit includes at least one trigger element for supplying the connected coupling winding with electrical energy.

8. The steering system as recited in claim 2, further comprising:
   at least one sensor for detecting the functioning of the coupling unit; and
   at least one data line for exchanging information between the electrical control units;
   wherein the first mechanical device is a steering handle and the second mechanical device is a steered vehicle wheel, and
   wherein at least one electrical control unit includes at least one trigger element for supplying the connected coupling winding with electrical energy.

* * * * *

UNITED STATES PATENT AND TRADEMARK OFFICE
CERTIFICATE OF CORRECTION

PATENT NO.       : 7,581,617 B2                                        Page 1 of 1
APPLICATION NO.  : 10/575717
DATED            : September 1, 2009
INVENTOR(S)      : Pfeiffer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 309 days.

Signed and Sealed this

Fourteenth Day of September, 2010

David J. Kappos
*Director of the United States Patent and Trademark Office*